Figure 1:
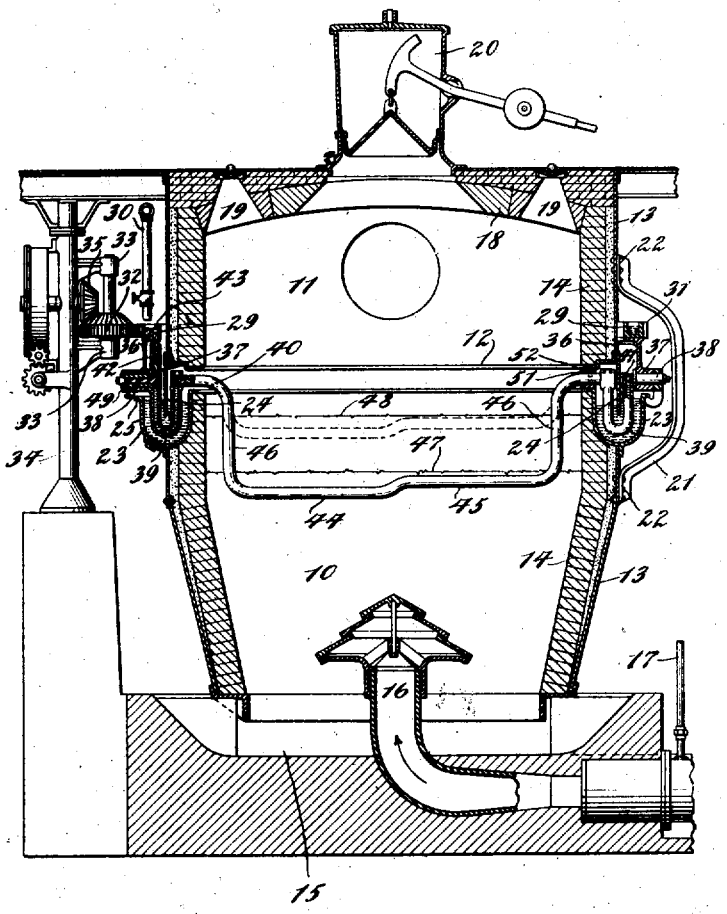

W. B. CHAPMAN.

GAS PRODUCER.

APPLICATION FILED FEB. 29, 1916.

Reissued Apr. 4, 1916.

14,098.

2 SHEETS—SHEET 1.

Inventor

William B. Chapman

By his Attorney

Isaac B. Owens

W. B. CHAPMAN.
GAS PRODUCER.
APPLICATION FILED FEB. 29, 1916.
Reissued Apr. 4, 1916.
14,098.
2 SHEETS—SHEET 2.
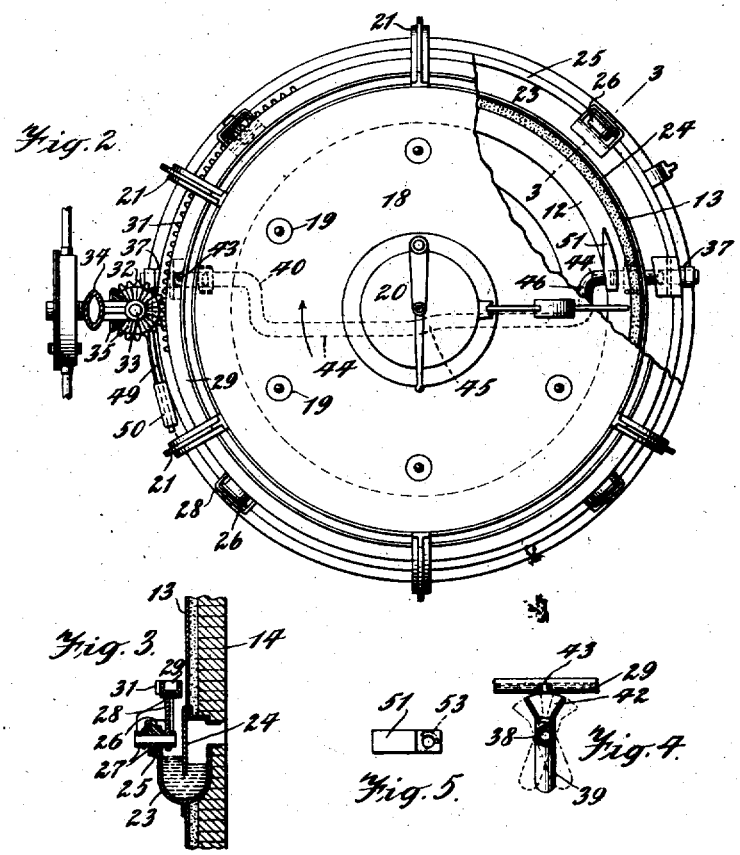
William B. Chapman Inventor
By his Attorney
Isaac B. Owens

UNITED STATES PATENT OFFICE.

WILLIAM B. CHAPMAN, OF MOUNT VERNON, OHIO, ASSIGNOR TO CHAPMAN ENGINEERING COMPANY, OF MOUNT VERNON, OHIO, A CORPORATION OF NEW YORK.

GAS-PRODUCER.

14,098. Specification of Reissued Letters Patent. Reissued Apr. 4, 1916.

Original No. 1,162,452, dated November 30, 1915, Serial No. 14,715. Application for reissue filed February 29, 1916. Serial No. 81,215.

*To all whom it may concern:*

Be it known that I, WILLIAM B. CHAPMAN, a citizen of the United States, and a resident of Mount Vernon, county of Knox, and State of Ohio, have invented certain new and useful Improvements in Gas-Producers, of which the following is a specification.

This invention relates to a gas producer of novel construction and more particularly to novel and effective means for maintaining a uniform fuel bed free from agglomerated masses, blow holes and other irregularities that are apt to interfere with an effective operation of the gas producer. As is well known in the art, the maintenance of a uniform zone of combustion for a protracted length of time is extremely difficult with apparatus of the kind referred to owing to the high temperature of said zone, to the varying nature of the fuel employed, to the varying height of the fuel bed and to other general conditions that are subject to variations during the regular operation of the gas producer and have heretofore required a continuous intelligent observation of the producer by the attendants.

The present invention has for its purpose the continuous maintenance of a fuel bed of proper composition and density by means of a slowly rotating leveling and agitating device that automatically adapts itself to the varying heights of the fuel bed without in the least affecting its efficiency.

The invention furthermore comprises other novel features of construction as more fully set forth in the appended specification and claims.

In the accompanying drawing, Figure 1 is a vertical section through a gas producer embodying my invention; Fig. 2 a plan view partly in section thereof; Fig. 3 an enlarged cross section on line 3—3, Fig. 2; Fig. 4 a detailed section showing the means for supplying cooling water to the leveling tube, and Fig. 5 a detail of the cleaning member for the annular producer-slot.

My improved gas producer comprises essentially a stationary lower section 10 and a likewise stationary upper section, 11 separated by an intervening comparatively narrow circumferential slot 12 as clearly illustrated in Fig. 1, each of these sections 10, 11 being composed of a metallic shell 13, the usual fire brick lining 14 and an intermediate filling of loose non-conducting material. Below the preferably conical lower portion of section 10 is located the usual ash-pit 15 while the necessary air of combustion is admitted to the fuel charge through an inlet tube 16 which air may be charged with steam, etc., through a branch pipe 17. At its upper end, section 11 is closed by a top 18 shown to be provided with poke holes 19 and a charging hopper 20 of convenient construction, Upper section 11 is held in position by a plurality of arched brackets or braces 21 riveted or otherwise secured as at 22 to the metallic shells of the lower and upper sections 10, 11 of the gas producer.

The upper end of section 10 is provided with an exteriorly arranged annular trough 23 containing water or another sealing liquid into which dips an annular skirt or shield 24 depending from the upper producer section 11. Trough 23 is provided with an outwardly extending flange 25 that constitutes the track for a plurality of rollers 26 journaled in bearings 27 of brackets 28. The latter are attached to a rotatable annular gutter or channeled ring 29 loosely surrounding the shell of the gas producer and adapted to be supplied with water through a valve-controlled inlet pipe 30. Ring 29 is exteriorly toothed as at 31 for the engagement with a pinion 32 the shaft of which is rotatably mounted in bearings 33 of a standard 34. Pinion 32 is driven at a low rate of speed through a train of gears 35 from a suitable motor or other source of power. From ring 29 depends a pair of additional brackets 36 provided with alined bearings 37 in each of which is loosely mounted the trunnion 38 of a goose-neck 39 extending into trough 23 and straddling skirt 24. To the opposed inner legs of goose-necks 39 are firmly attached the outer ends of a hollow substantially U-shaped agitating or stirring member 40 the interior of which communicates with the interior of goose-necks 39. The outer leg of one of the latter is provided with an overflow orifice 41 while the outer leg of the other goose-neck is furnished with an upwardly extending funnel 42 located below an outlet orifice 43 of gutter 29. As the stirring member or tube 40 is freely suspended in bearings 37, this tube will have the tendency to assume a vertical position as illustrated in Fig. 1. The lower cross web of the agitating tube is preferably composed of two stepped portions 44, 45 while its depending shanks 46 are of such a length that the cross web 44, 45 will project into the upper stratum of the fuel bed, the line 47 indicating the lowest level which the top of the fuel bed may assume. It will thus be seen that when ring 29 together with the agitating tube 40 is slowly rotated through pinion 32, the stepped cross web 44, 45 which extends substantially across the entire width of the gas producer, will be partly pushed and partly dragged through the upper stratum of the fuel bed thereby leveling and compacting the same while simultaneously closing up any blow or fire holes that may have been formed during the operation of the gas producer. The slicing tube 40 furthermore constitutes a spreader for conveying the fuel from the point or points at which it drops upon the surface of the fuel bed to all other points of said surface, thereby uniformly distributing the fuel. So also the tube 40 while being slowly moved through the fuel bed, breaks up its tendency to bake or cake thus effectively preventing the formation of blow holes and precluding a clinkering of the fuel. When the top of the fire bed rises (the highest level being indicated by line 48) the tube 40 will become automatically swung upward to assume a more or less inclined position. In order to increase the gravity action of the tube 40, any mechanical means may be employed that tend to depress said tube into the fire bed, the drawing showing an arm 49 firmly attached to one of the trunnions 38, said arm carrying an adjustable weight 50. This weight tends to depress the tube 40 for a certain depth into the upper stratum of the fuel bed to produce the desired slicing and leveling operation and to uniformize the density of the fuel bed, thus insuring in turn a uniform generation of gas. Owing to the step provided in the cross web of the tube 40 the equalizing action thereof is increased, the tube being preferably rotated in such a direction that the portion of the tube which is being pushed ahead lies at less depth within the fuel than the other portion which is dragged through the coal.

It will be seen that my improved gas producer presents numerous advantages over the constructions heretofore generally known. The entire shell of the gas producer is stationary while the stirring tube only, is rotated thus economizing power. Owing to the peculiar support of said tube, the latter will automatically adjust itself to any height of the fuel bed without impairing its efficiency. The relative arrangement between the top of the fuel bed, the annular slot 12 of the gas producer and the water seal for said slot prevents any clogging of said slot and seal by particles of the fuel entering the same.

Although I prefer to provide a stationary shell and a rotary agitating tube, it should of course be understood that this relation may be reversed, *i. e.* that the tube may be suspended from stationary bearings while the shell together with the fuel bed may be rotated without departing from the spirit of my invention.

The cooling of tube 40 is effected by the water discharged into gutter 29 through pipe 30 and flowing through orifice 43 into the funnel-shaped extension 42 whence the water will flow through tube 40 to be discharged through overflow 41 into trough 23. The water overflowing from said trough may finally be led away in any suitable manner.

In order to keep slot 12 permanently clean, a sweeping or scraping member 51 is loosely mounted upon tube 40 while an axial displacement of said member on the tube is prevented by a pin 52 extending outward from said tube and engaging a corresponding slot 53 of said member. It will be seen that during the rotation of the tube 40, member 51 will return all solid particles that may have become settled upon the bottom of slot 12 into the interior of the producer, thereby preventing a clogging of the slot and water seal.

Although my invention has been described with reference to the particular embodiment thereof as illustrated in the drawing, I desire it to be understood that I do not limit myself to the construction shown and described but that the same may be varied in several ways and may still come within the scope of the appended claims.

The application on which this patent issued was copending with my earlier filed application 875,212 filed December 3, 1914 the claims in which cover, in respect to the swinging agitator, the genus of the species of such agitator claimed in this present patent.

I claim:—

1. A gas producer comprising a stationary shell adapted to receive a charge to be gasified and provided with a circumferential slot, and a rotary charge-agitating device extending through said slot into the shell and constructed to automatically adjust itself to the height of said charge.

2. A gas producer comprising a stationary shell adapted to receive a charge to be gasified and provided with a circumferential slot, a liquid seal provided for said slot, and a rotary charge-agitating device extending through said seal and slot into the shell and constructed to automatically adjust itself to the height of said charge.

3. A gas producer comprising a stationary shell adapted to receive a charge to be gasified and provided with a circumferential slot, a liquid seal provided for said slot, and a swingingly suspended substantially U-shaped rotary charge-agitating member extending through said seal and slot into the shell.

4. A gas producer comprising a stationary shell adapted to receive a charge to be gasified and provided with a circumferential slot, a gravity actuated charge agitating member extending through said slot into the shell, and means for rotating said member.

5. A gas producer comprising a stationary shell adapted to receive a charge to be gasified and provided with a circumferential slot, a U-shaped gravity-actuated charge-agitating member extending through said slot into the shell, and means for rotating said member.

6. A gas producer comprising a stationary shell adapted to receive a charge to be gasified and provided with a circumferential slot, a U-shaped gravity-actuated charge-agitating member extending through said slot into the shell and having a stepped cross-web, and means for rotating said member.

7. A gas producer comprising a stationary shell adapted to receive a charge to be gasified and provided with a circumferential slot, a gravity-actuated charge-agitating tube extending through said slot into the shell, means for interiorly cooling said tube, and means for rotating the tube.

8. A gas producer comprising a stationary shell adapted to receive a charge to be gasified and provided with a circumferential slot, a liquid seal provided for said slot, a gravity-actuated hollow charge-agitating member extending through said seal and slot into the shell, means for interiorly cooling said member, and means for rotating said member.

9. A gas producer comprising a stationary shell adapted to receive a charge to be gasified and provided with a circumferential slot, a ring constructed to be rotatable about said shell, and a charge-agitating member pivotally suspended from said ring and extending through the slot into the shell.

10. A gas producer comprising a stationary shell adapted to receive a charge to be gasified and provided with a circumferential slot, a liquid seal provided for said slot, a ring constructed to be rotatable about said shell, and a charge-agitating member pivotally suspended from said ring and extending through said seal and slot into the shell.

11. A gas producer comprising a stationary shell adapted to receive a charge to be gasified and provided with a circumferential slot, a ring constructed to be rotatable about said shell and provided with a channel having an outer orifice, means for supplying a cooling liquid to said channel, a charge-agitating hollow member pivotally suspended from said ring and extending through said slot into the shell, and a funnel-shaped extension on said member located below the outlet orifice.

12. A gas producer comprising a stationary substantially cylindrical shell adapted to receive a charge to be gasified and comprising a lower portion and an upper portion separated from each other by an intervening slot, a circular trough at the upper end of the lower shell-portion and adapted to contain a sealing liquid, a skirt extending from the upper shell-portion into the trough, a ring constructed to be rotatable about the shell, and a charge-agitating member pivotally suspended from said ring and extending into the shell through the space formed between the trough and the skirt.

13. A gas producer comprising a stationary substantially cylindrical shell adapted to receive a charge to be gasified and comprising a lower portion and an upper portion separated from each other by an intervening slot, a circular trough at the upper end of the lower shell-portion and adapted to contain a sealing liquid, a skirt extending from the upper shell-portion into the trough, a ring constructed to be rotatable about the shell, a pair of opposed brackets depending from said ring, goose-necks journaled in said brackets and straddling the skirt, and a charge-agitating member extending from the goose-necks through the slot into the shell.

14. A gas producer comprising a stationary substantially cylindrical shell adapted to receive a charge to be gasified and comprising a lower portion and an upper portion separated from each other by an intervening slot, a circular trough at the upper end of the lower shell-portion and adapted to contain a sealing liquid, a skirt extending from the upper shell-portion into the trough, a ring constructed to be rotatable about the shell, a pair of opposed brackets depending from said ring, goose-necks journaled in said brackets and straddling the skirt, a charge-agitating tube communicating with the interior of the goose-necks and extending through the slot into the shell, and means for supplying a cooling liquid to one of said goose-necks.

15. A gas producer comprising a stationary substantially cylindrical shell adapted to receive a charge to be gasified and comprising a lower portion and an upper portion separated from each other by an intervening slot, a circular trough at the upper end of the lower shell-portion and adapted to contain a sealing liquid, a skirt extending from the upper shell-portion into the trough, a ring constructed to be rotatable about the shell, a pair of opposed brackets depending from said ring, goose-necks journaled in said brackets and straddling the skirt, a charge-agitating tube communicating with the interior of the goose-necks and extending through the slot into the shell, means for supplying a cooling liquid to one of said goose-necks, and a liquid discharge orifice provided on the other neck.

16. A gas producer comprising a stationary substantially cylindrical shell adapted to receive a charge to be gasified and comprising a lower portion and an upper portion separated from each other by an intervening slot, a circular trough at the upper end of the lower shell-portion and adapted to contain a sealing liquid, a skirt extending from the upper shell-portion into the trough, a circular track formed on said trough, a ring having a plurality of rollers engaging said track, a charge-agitating member pivotally suspended from said ring and extending into the shell through the trough and slot, and means for rotating the ring.

17. A gas producer comprising a stationary shell adapted to receive a charge to be gasified and provided with a circumferential slot, a rotary charge-agitating tube extending through said slot into the shell and constructed to automatically adjust itself to the height of said charge, means for passing a cooling medium through said tube, and a sweeping member loosely mounted on the tube and engaging the slot-bottom.

18. A gas producer comprising a shell adapted to contain a fuel bed, a substantially U-shaped charge-agitating member extending through said shell into the fuel bed and constructed to automatically adjust itself to the height of said bed, said member being composed of a pair of shanks of unequal length and a connecting cross-web, and means for effecting relative rotary motion between said fuel bed and member.

19. A gas producer, the body of which is divided into two sections, a seal at the joint between the sections, an agitator with parts extending through said seal, the agitator playing freely vertically and means for causing relative horizontal travel between the agitator and the charge.

WILLIAM B. CHAPMAN.

Witnesses:
ISAAC B. OWENS,
PATRICK A. BOLGER.